Sept. 29, 1964   W. LÖLIGER   3,150,713
METHOD OF AND APPARATUS FOR CONTROLLING THE END VALUE OF THE
SPECIFIC GRAVITY OF A LIQUID IN PLANTS WHEREIN THE
LIQUID IS HEATED BY THE ADMIXTURE OF STEAM
Filed Dec. 31, 1962   3 Sheets-Sheet 1

Inventor:
WILLI LÖLIGER
By K. A. May
ATTORNEY

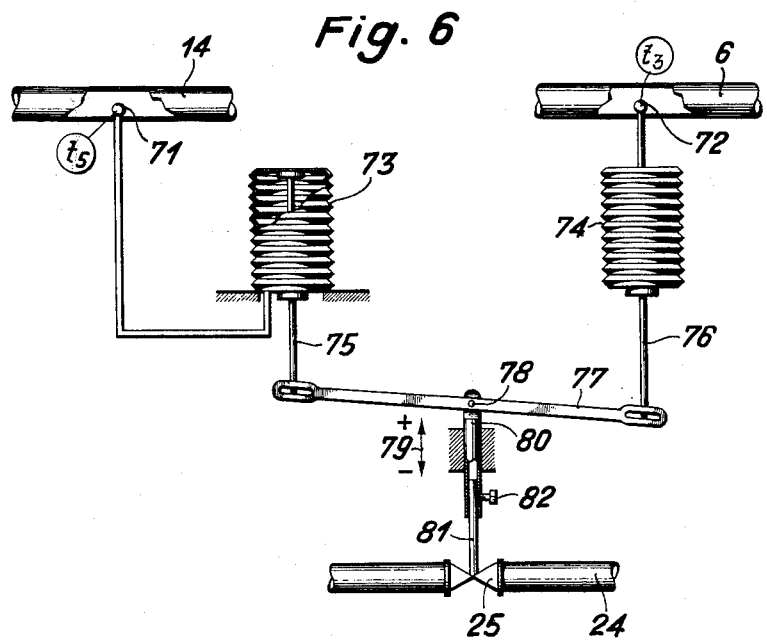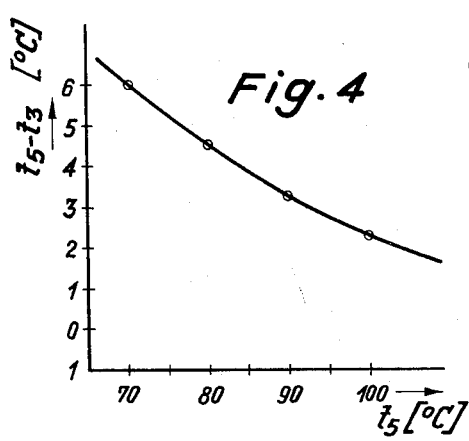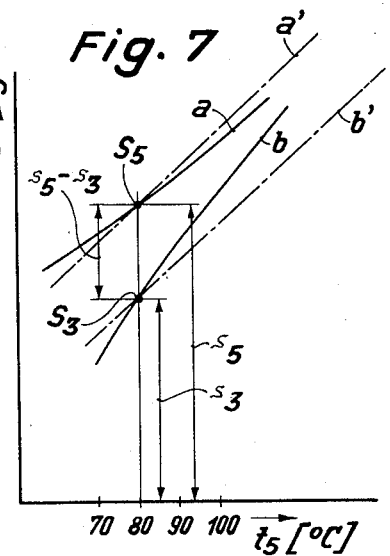

United States Patent Office 3,150,713
Patented Sept. 29, 1964

3,150,713
METHOD OF AND APPARATUS FOR CONTROLLING THE END VALUE OF THE SPECIFIC GRAVITY OF A LIQUID IN PLANTS WHEREIN THE LIQUID IS HEATED BY THE ADMIXTURE OF STEAM
Willi Löliger, Konolfingen, Switzerland, assignor to Alpura AG, Bern, Switzerland, a corporation of Switzerland
Filed Dec. 31, 1962, Ser. No. 248,366
Claims priority, application Switzerland Jan. 4, 1962
8 Claims. (Cl. 165—19)

This invention relates to a method of controlling the final specific gravity of a liquid in relation to its initial specific gravity in plants wherein the liquid is heated by bringing it directly into contact with steam whereafter the liquid is cooled by expansion accompanied by partial evaporation, for example, for sterilizing the liquid. This treatment is particularly important for milk which is heated during a very short time to a temperature of, for example, 150° C. sufficient to destroy any germs, the immediately following cooling preventing any deterioration of the milk.

In plants of the kind described, the water content of the liquid to be treated is changed twice. As a result of the contact with steam, vapor condenses in the liquid, while on the following expansion steam is released from the liquid. In some cases further variations in the water content may occur, namely if the liquid is subjected to degasification before heating, during which degasification gases dissolved in the liquid, or steam, may escape from the liquid as a result of reduction of the pressure, or if the first expansion is followed by one or more additional pressure reductions.

Depending upon the particular conditions, the control of the final specific gravity of the treated liquid, i.e., the concentration of the liquid, is an important requirement. When treating fresh milk intended for consumption, it is essential that the concentration of the treated milk, i.e., the ratio between the water content and the dry substance, has the same value as the concentration of the nontreated milk. In other cases, a specific thickening or dilution may be required.

It is known to influence the final specific gravity indirectly by regulation of the difference between the initial temperature before heating and the temperature after expansion. This system is based on the principle that the water content of the treated liquid is lower when the initial or preheat temperature is higher and when the expansion temperature is lower, and vice versa.

It is an object of the present invention to provide a method whereby the final specific gravity of a liquid which is heated by admixture of steam and which, thereupon, is expanded to release steam, is more accurately controlled than by conventional methods.

If, for example, the final water content of a liquid is to be restored to the original value by expansion, the weight of steam fed to the liquid during heating must be equal to the weight of steam withdrawn from the liquid. Since the specific heat content of the steam supplied to the liquid is greater than that of the steam released by expansion, there is a certain difference between the temperatures of the liquid before heating and the temperature of the expanded liquid, the temperature of the expanded liquid usually being somewhat higher than the initial temperature of the liquid. If, in order to maintain an equal specific gravity before heating and after expansion, the difference between the expansion temperature and the initial temperature is maintained at a constant value, there is still a possibility of inaccuracy, because, if the level of the initial and expansion temperatures changes, the final concentration of the liquid changes undesirably which results from the temperature-dependent specific heat content of the steam released by expansion and from the changed relationship between the heating temperature and said temperature level.

The object of the invention is to avoid this inaccuracy by adjusting the difference between the initial and the final temperatures of the liquid according to variations of at least one of the two temperatures. This makes it possible to adapt said temperature difference to the temperature level thereof whereby inaccuracies of the final concentration of the liquid are continuously corrected. The method according to the invention may also be applied to processes wherein the specific gravity of the treated liquid is desired to be different from that of the untreated liquid.

A further object of the invention is to provide an apparatus for performing the aforedescribed method. The apparatus comprises a feed system which continuously feeds the liquid to be treated into a heating system and then into an expansion system, the heating system including means for bringing the liquid into contact with steam, a regulating system comprising an element sensing the initial temperature of the liquid before it is heated and an element sensing the temperature of the expanded liquid, a comparison element operatively connected to said temperature sensing elements and producing a regulating signal corresponding to the difference between the two temperatures and means responsive to said regulating signal for influencing at least one of the two aforesaid temperatures. The apparatus according to the invention comprises an additional element which is responsive to at least one of the two temperatures and which enlarges or reduces, to a predetermined extent, the signal produced by the comparison element according to variations of the temperature to which said additional element responds.

In the method according to the invention a regulating signal is formed according to the difference between the initial temperature and the expansion temperature of the liquid, the regulating signal being transformed, to a predetermined extent, according to variations of the absolute value of at least one of these temperatures and the transformed signal is used to produce a correspondingly transformed difference between the initial temperature and the expansion temperature. For the purpose of regulating the temperature difference and adjusting the same either the quantity of heat delivered to the liquid prior to the heating by the admixture of steam or the expansion temperature is influenced, for example, by variation of the expansion pressure. In the apparatus performing the aforedescribed steps the regulating signal produced by the comparison element and influenced by the additional element may either actuate a regulating valve which adjusts the supply of a heating medium to a preheating system for the liquid, or the regulating signal may actuate means for varying the expansion pressure of the liquid. For controlling the expansion pressure a regulating valve may be actuated which valve is interposed in a pipe connecting a steam chamber forming part of the expansion system to a lower pressure chamber.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 4 is a graph showing the relation between the expansion temperature of the liquid and the difference between the temperature of the liquid prior to heating by the admixture of steam and the temperature of the expanded liquid in a plant according to FIG. 1 wherein the specific gravity of the treated milk is maintained at the same value as that of the raw milk introduced into the plant.

Figure 1:
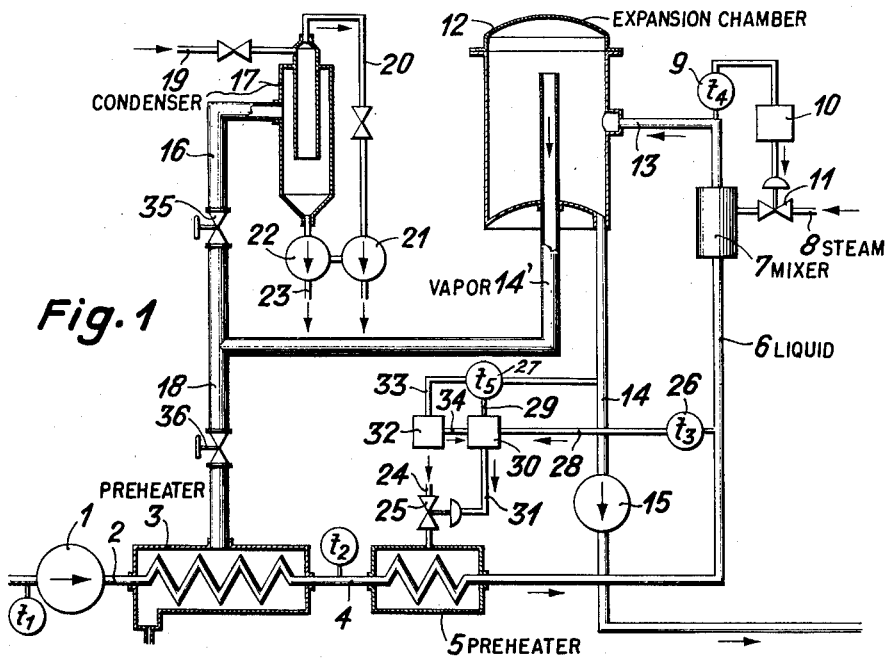
FIG. 1 is a diagrammatic illustration of a plant for treating fresh milk and provided with a regulating system according to the invention whereby the difference between the temperature of the heated liquid and that of the expanded liquid is influenced by variation of the temperature of the liquid prior to heating.
Figure 5:
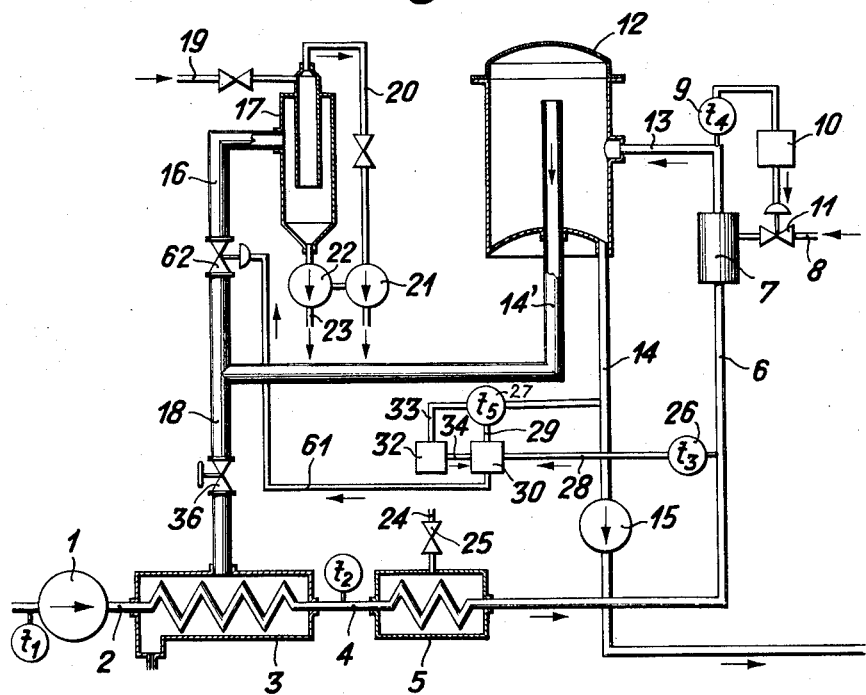

FIG. 5 diagrammatically shows a plant according to FIG. 1 wherein, however, the difference between the temperature prior to heating by the admixture of steam and that of the expanded liquid is influenced by variation of the expansion pressure.

FIG. 6 is a diagrammatic illustration of a regulating system in which the difference between the expansion temperature and the initial temperature is adjusted according to variations of these two temperatures.

FIG. 7 is a graph showing the operating characteristics of temperature-sensitive elements usable in the system according to FIG. 6.

Figure 2:
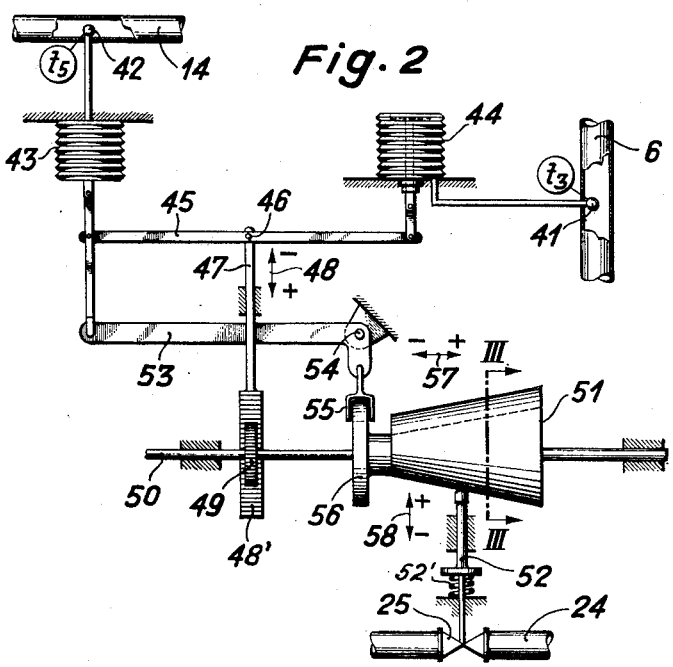
FIG. 2 shows an embodiment of the regulating system illustrated diagrammatically in FIG. 1.
Figure 3:
FIG. 3 is a section on the line III—III in FIG. 2.

In the system shown in FIGS. 1 to 3 of the drawing wherein like parts are designated by like numerals, milk to be treated is fed at increased pressure from a reservoir, not shown, by a pump 1 through a pipe 2 to a preheater 3 and therefrom through a pipe 4 to a preheater 5 wherefrom the preheated milk flows at an initial or preheat temperature $t_3$ through a pipe 6 to a heating system 7. In the latter the milk is sterilized by heating the milk, for example, to 150° C. for a short period of time by the admixture of steam. The latter is supplied by a steam generator, not shown, through a pipe 8. To regulate the temperature $t_4$ to which the mik is heated by the admixed steam, a regulating system is provided which includes a temperature-sensitive element 9, a regulator 10 and a regulating valve 11, and which influences the rate of steam supply so as to maintain the temperature of the heated milk at a predetermined, constant value. The apparatus is preferably so designed and operated at such pressures and temperatures that the steam admixed to the milk condenses completely in the milk.

In order to prevent deterioration of the milk by the relatively high temperature to which it is heated, the milk is cooled immediately after heating. This is effected by rapid reduction of the pressure of the heated milk in an expansion chamber 12, which is connected by a pipe 13 to the heating system 7. A pressure below atmospheric pressure is maintained inside the chamber 12, which is formed by a closed container. Upon the sudden reduction of the pressure, a certain quantity of water is released according to the expansion pressure and is discharged as vapor through a pipe 14'.

The milk cooled in a temperature $t_5$ which is below the atmospheric boiling point, is discharged from the plant through a pipe 14 and a pump 15 and may be fed, for example, to a conventional plate cooler for further cooling. The vapor escaping through the pipe 14' flows partly through a pipe 16 provided with a valve 35 to a condenser 17 and partly through a pipe 18 provided with a valve 36 to the steam chamber of the preheater 3 wherein the heat contained in the vapor is indirectly transferred to the milk flowing through the preheater 3. The resulting condensate may be fed to the bottom part of the condenser 17 through a separator by means not shown. The condenser 17 is constructed as an injection condenser, fresh water being injected from a pipe 19.

In order to produce a suitable negative pressure inside the expansion chamber 12, the condenser 17 is connected to a vacuum pump 21 through a pipe 20. The mixture of injection water and condensate is discharged through a pipe 23 by means of a condensate pump 22.

The preheater 5 following the preheater 3 is heated by a heating medium, for example hot water or steam, which medium is supplied through a pipe 24 provided with a regulating valve 25.

The specific gravity of the treated milk depends on the relationship between the temperature $t_3$ of the preheated milk and the expansion temperature $t_5$; these temperatures are sensed by temperature-sensitive elements 26 and 27, respectively. Hereinbelow it will be assumed that the milk discharged through the pipe 14 has the same specific gravity as the raw milk supplied through the pipe 2.

The following heat balance equation can be applied to the heating in the system 7:

$$Q \cdot c_1 \cdot t_3 + D_1 \cdot i_1 = Q \cdot c_1 \cdot t_4 + D_1 \cdot c_2 \cdot t_4$$

The equation for the expansion stage is as follows:

$$Q \cdot c_1 \cdot t_4 + D_1 \cdot c_2 \cdot t_4 = Q \cdot c_1 \cdot t_5 + D_2 \cdot i_2$$

wherein: Q denotes the milk throughput, $c_1$ the specific heat of the milk, $c_2$ the specific heat of the steam condensate, $t_3$ the temperature of the preheated milk, $t_4$ the temperature of the milk heated by admixture of steam, $t_5$ the expansion temperature, $D_1$ the quantity of steam admixed to the milk, $D_2$ the quantity of vapor escaping from the liquid during expansion, $i_1$ the specific heat content of the heating steam and $i_2$ the specific heat content of the released vapor.

If the specific gravity of the raw milk is equal to that of the treated milk, $D_1 = D_2 = D$. Therefore, each of the above equations gives a relation for the value D, and these relations result in the following equation for the temperature difference $t_5 - t_3$:

$$t_5 - t_3 = \frac{(t_4 - t_3) \cdot (i_1 - i_2)}{i_2 - c_2 \cdot t_4}$$

For obvious reasons, $t_4$ will be kept constant by apparatus as shown in FIG. 1. From the above final equation it is clear that at equal specific gravity of the preheated milk and of the milk leaving the plant a specific temperature difference $t_5 - t_3$ must be associated with each expansion temperature. FIG. 4 shows the relationship between the expansion temperature $t_5$ and the temperature difference $t_5 - t_3$ for a temperature $t_4$ of 150° C. and heating of the milk with saturated steam of a temperature of 175° C. and a pressure of 9 kg. per sq. cm., by way of example.

A temperature difference calculated in this way does not allow for inevitable heat losses. Experience has shown that the temperature difference $t_5 - t_3$ must be maintained somewhat smaller to allow for the heat losses.

In the plant shown in FIG. 1 the above interrelations are utilized as follows: The signals produced by the temperature-sensitive elements 26 and 27 are fed through lines 28 and 29, respectively, to a comparison device 30 which produces a signal corresponding to the difference between the temperatures $t_5$ and $t_3$. This signal is conducted through a conduit 31 to the regulating valve 25 for actuating the latter. In this way, the quantity of heat delivered to the liquid in the preheater 5 is automatically influenced so as to maintain the temperature difference $t_5 - t_3$ constant.

If the absolute value of the expansion temperature or of the preheat temperature is altered for some reason, there is a deviation of the specific gravity from the desired specific gravity despite the fact that the temperature difference $t_5 - t_3$ remains constant. To prevent this, according to the invention, the said temperature difference is adjusted according to variations in the expansion temperature. To this end, an additional element 32 is provided to which the signal corresponding to the expansion temperature $t_5$ is fed from the temperature sensitive element 27 through a line 33. By way of a line 34 the element 32 applies an adjusting signal to the comparison device 30 according to a predetermined characteristic corresponding to the curve shown in FIG. 4, so that the signal leaving the device 30 through the line 31 is transformed or modified corresponding to the variation of the expansion temperature.

In this way the temperature difference $t_5-t_3$ required for a constant specific gravity of the treated liquid is automatically adapted to the temperature level corresponding to the expansion temperature or the preheat temperature at any time. This has the additional advantage that the expansion temperature need not be regulated, but can be adjusted by manual adjustment to a value suitable for the treated material, for example, by appropriate adjustment of the valves 35 and 36. An expansion temperature of about 80° C. is advisable for milk; the corresponding pressure causes expelling of undesirable stable and fodder odors.

It will readily be seen that the invention makes it also possible to control the specific gravity of the treated liquid in such manner that it differs to a predetermined extent from the specific gravity of the liquid supplied. To this end, it is only necessary to calculate or determine by tests the difference between the initial temperature immediately before heating and the expansion temperature which corresponds to the required thickening or dilution. The operating characteristic of the signal transforming device 32 must be adapted to the dependency of this temperature difference on the variable expansion temperatures.

FIG. 2 illustrates a possible implementation of the regulating system shown diagrammatically in FIG. 1. The temperatures $t_3$ and $t_5$ are sensed by temperature-sensitive elements 41 and 42 which are filled with an evaporable liquid and which in known manner produce inside bellows 43 and 44 a pressure corresponding to the sensed temperature. The movements of the bellows 43 and 44 are transmitted to a lever 45 swinging on a pin 46 mounted on a rod 47 which is supported for axial vertical movement. The rod 47 moves up or down, depending on variations of the temperature difference $t_5-t_3$. An increasing temperature difference causes downward movement of the rod 47 in the + direction of the double arrow 48. At decreasing temperature difference the rod 47 moves upward in the − direction of the double arrow 48. The lower end of the rod 47 is provided with a rack 48' whose teeth are in engagement with the teeth of a gearwheel 49 mounted on a shaft 50. The shaft 50 carries a control element 51 which is rotated upon rotation of the shaft 50 and is axially movable on said shaft. The surface of the control element 51 serves as a cam surface for actuating a cam follower rod 52 which is connected to the valve 25 in the pipe line 24 for actuating said valve. The rod 52 is provided with a flange abutting against one end of a coil spring 52' whose second end rests on a stationary surface. The spring 52' urges the rod 52 against the surface of the element 51. The valve 25 controls the supply of heating medium to the preheater 5. As seen in FIG. 3, the surface of the element 51 is so shaped as to cause an upward movement of the rod 52 in the + direction of the double arrow 58 and an opening of the valve 25 for increasing supply of heating medium upon a downward movement of the rod 47. Increased supply of heating medium to the preheater 5 causes an increase of the temperature of the liquid flowing through the pipe 6 whereby the temperature difference $t_5-t_3$ is reduced.

Movement of the bellows 43 is also transmitted to an angle lever 53 which swings on a stationary fulcrum 54. The free end of the downwardly extending arm of the lever 53 forms a fork 55, straddling a flange 56 rigidly connected to the element 51. An increase of the expansion temperature $t_5$ causes counterclockwise swinging of the lever 53 and movement of the flange 56 and of the element 51 in the + direction of the double arrow 57, i.e. to the right in FIG. 2. Because of the inclination of the surface of the element 51 the valve-actuating rod 52 is thereby allowed to move in the + direction of the double arrow 58, opening the valve 25. The movement of the rod 52 depends on the combination of two movements of the element 51, one of said movements corresponding to the temperature difference $t_5-t_3$ and the second of said movements corresponding to the variations of the expansion temperature $t_5$, or of the level of the temperature difference. As explained in connection with the description of FIG. 1, the temperature difference $t_5-t_3$ is automatically adjusted according to changes of the expansion temperature $t_5$ so that the treated liquid has the same specific gravity as the raw liquid before treatment.

The plant diagrammatically shown in FIG. 5 is similar to the plant shown in FIG. 1. In the plant shown in FIG. 5 the difference between the preheat temperature and the expansion temperature, however, is not regulated by regulating the amount of heat supplied in the preheater 5, but by controlling a valve 62 corresponding to the valve 35 shown in FIG. 1. The valve 62 is controlled in response to the signal produced in the comparison device 30 which signal has been modified or transformed by the device 32 and is conducted through a conduit 61 to the valve 62 in the pipe 16. Closing of the valve 62 causes an increase of the pressure in the expansion chamber 12 and thereby an increase of the expansion temperature $t_5$, and vice versa.

In the aforedescribed and illustrated examples the difference between the initial or preheat temperature of the liquid to be treated and the expansion temperature of the treated liquid is adjusted according to changes of the expansion temperature. Since, due to the control of the difference between the two temperatures both temperatures are rigidly coupled, the adjustment of the temperature difference to obtain a predetermined specific gravity of the treated liquid can be effected according to changes of one of the two temperatures, for example, according to the changes of the initial or preheat temperature. In this case, in the plant according to FIG. 1 the additional element 32 would have to be influenced by the temperature $t_3$ instead of by the temperature $t_5$ so that the temperature difference $t_5-t_3$ shown in FIGURE 4 would be obtained for the expansion temperature $t_5$ shown in FIG. 4.

It is also possible to adjust the difference between the initial temperature and the expansion temperature according to changes of both said temperatures in order to maintain a desired specific gravity of the treated liquid. A suitable arrangement is diagrammatically shown in FIG. 6. The temperature $t_5$ sensed by a device 71 is transformed into pressure acting inside a bellows 73 and the temperature $t_3$ is sensed by a device 72 wherein the temperature is transformed into pressure which acts inside bellows 74. The movements of the bellows 73 and 74 are transmitted by rods 75 and 76, respectively, to the ends of a two-arm lever 77, swinging on a pin 78 mounted on an axially vertically movable rod 80. An increase of the temperature difference $t_5-t_3$ causes an upward movement of the pin 78 in the + direction of the double arrow 79, and vice versa.

A spindle 81 of the valve 25 which is interposed in the conduit 24 for supplying a heating medium to the preheater 5 is adjustably connected to the rod 80. An undesired increase of the temperature difference $t_5-t_3$ causes an upward movement of the rods 80, 81 and opening of the valve 25 whereby the preheat temperature $t_3$ is increased and the temperature difference is restored to the desired value. A decrease of the temperature difference caused either by an undesired lowering of the expansion temperature or rise of the preheat temperature effects closing of the valve 25. By manipulating a set screw 82 the relative positions of the rods 80 and 81 can be changed for adjusting the temperature difference which is desired to be maintained.

Let us assume in the position of the lever 77 shown in FIG. 6 the expansion temperature $t_5$ is 80° C. and the preheat temperature $t_3$ is 75.5° C. Therefore, the difference $t_5-t_3$ is 4.5° C. and corresponds, for example, to the value shown in FIG. 4 which is based on equal specific gravity of the treated and untreated liquid, not allowing, however, for external heat losses. Points $S_3$ and $S_5$ in FIG. 7 illustrate this situation. The abscissae in FIG. 7 represent the temperature $t_5$ and the ordinates represent the distances $s$ of the ends of the lever 77 from a reference position wherein both temperature sensitive devices 71 and 72 are subjected to the same temperature.

If the temperature sensitive devices 71, 73 and 72, 74 have the same characteristic, a change of the level of the sensed temperature difference would cause travel of the two points $S_3$ and $S_5$ on two parallel lines, for example $a'$ and $b'$. With an apparatus of this kind a constant difference between the expansion temperature and the preheat temperature is obtained.

In order to adjust the temperature difference according to changes of the expansion temperature and of the preheat temperature, according to the invention, the characteristic of the two temperature sensitive devices is so changed by suitable means that the points $S_5$ and $S_3$ travel on lines $a$ and $b$ of FIG. 7. This may be obtained, for example, by using different vaporizable substances in the devices 71 and 72, or by moving the pin 78 to the right so that the right arm of the lever 77 is shorter than the left arm, or by using bellows 73 and 74 of different elasticity constants. The lines or characteristics $a$ and $b$ are so chosen that according to the interrelation of the conditions shown in FIG. 4 the difference $s_5-s_3$ and therefore the temperature difference $t_5-t_3$ is reduced at increasing expansion pressure or initial temperature, and vice versa. The apparatus shown in FIG. 6 causes this adjustment in response to changes of the expansion temperature as well as of the preheat temperature.

The invention is not limited to the illustrated and described examples. For simplicity's sake, only control elements are shown which act proportionally and without servo-assistance. It is obvious that control devices having different time characteristics, for example, proportionally-integrally acting regulators may be used. Except in FIG. 6, no means are shown for adjusting the desired value of the difference between the expansion temperature and the initial temperature if, for example, a changeover from a first specific gravity of the treated fluid to a second specific gravity of the treated liquid is desired.

The invention is not limited to methods and apparatus for sterilizing liquids. It can also be used in connection with methods and apparatus wherein the admixture of steam causes destruction only of pathogenic organisms as is the case when pasteurizing. The invention is not limited to a method and apparatus for treating milk, but may equally well be used in connection with methods and apparatus for treating fruit juices, pharmaceutical auxiliary substances, and the like. The invention is not limited to use in connection with specific arrangements for mixing the liquid to be treated with the steam. In lieu of admixing the steam to the liquid the liquid may be spread into a steam atmosphere.

I claim:

1. A method of controlling the specific gravity of a liquid heated by admixture of steam and thereafter cooled by expansion and partial evaporation, relative to the specific gravity of the liquid prior to heating by admixture of steam, comprising:
   sensing the temperature of the liquid prior to heating by the admixture of steam,
   sensing the temperature of the liquid after expansion and partial evaporation,
   controlling one of said temperatures for maintaining a predetermined difference between the temperature of the liquid before heating by the admixture of steam and the temperature of the liquid after expansion and partial evaporation, and
   adjusting said predetermined temperature difference in response to at least one of said temperatures, whereby the temperature difference is increased upon a decrease of the temperature in response to which the temperature difference is adjusted, and vice versa.

2. A method of controlling the specific gravity of a liquid heated by admixture of steam and thereafter cooled by expansion and partial evaporation, relative to the specific gravity of the liquid prior to heating by admixture of steam comprising:
   sensing the temperature of the liquid prior to heating by the admixture of steam,
   sensing the temperature of the liquid after expansion and partial evaporation,
   preheating the liquid prior to the heating by admixture of steam and increasing preheating upon an increase of the difference between the temperature of the liquid prior to heating by the admixture of steam and the temperature of the liquid after expansion and partial evaporation, and visa versa, for generally maintaining a predetermined temperature difference, and
   adjusting said predetermined temperature difference in response to at least one of said temperatures, whereby the temperature difference is increased upon a decrease of the temperature in response to which the temperature difference is adjusted, and vice versa.

3. A method of controlling the specific gravity of a liquid heated by admixture of steam and thereafter cooled by expansion and partial evaporation, relative to the specific gravity of the liquid prior to heating by admixture of steam, comprising:
   sensing the temperature of the liquid prior to heating by the admixture of steam,
   sensing the temperature of the liquid after expansion and partial evaporation,
   increasing the expansion pressure upon an increase of the difference between the temperature of the liquid prior to heating by the admixture of steam and the temperature of the liquid after expansion and partial evaporation, and vice versa, for generally maintaining a predetermined temperature difference, and
   adjusting said predetermined temperature difference in response to at least one of said temperatures, whereby the temperature difference is increased upon a decrease of the temperature in response to which the temperature difference is adjusted, and vice versa.

4. A method of controlling the specific gravity of a liquid heated by admixture of steam and thereafter cooled by expansion and partial evaporation, relative to the specific gravity of the liquid prior to heating by admixture of steam, comprising:
   sensing the temperature of the liquid prior to heating by the admixture of steam,
   sensing the temperature of the liquid after expansion and partial evaporation,
   producing a control signal corresponding to the difference between said temperatures,
   transforming said control signal in response to at least one of said temperatures and to a predetermined degree for each temperature in response to which said control signal is transformed, and
   controlling one of said temperatures in response to the transformed control signal for generally maintaining said temperature difference and increasing said temperature difference upon decrease of the temperature in response to which said control signal is transformed, and vice versa.

5. An apparatus for controlling the specific gravity of a liquid heated by the admixture of steam, comprising:
   supply conduit means for continuously supplying the liquid to be heated,
   heating means continuously receiving liquid from said supply conduit means and including means for mixing the liquid with steam,
   expansion means connected to and continuously receiving heated liquid from said heating means and including means for releasing steam from the liquid and discharge conduit means for discharging the liquid from which steam has been released from said expansion means, temperature sensing means connected to said supply conduit means for sensing the temperature of the liquid prior to heating in said heating means, temperature sensing means connected to said discharge conduit means for sensing the temperature of the liquid discharged from said expansion means, a comparison device operatively connected to said temperature sensing means for producing a control signal corresponding to the difference between the temperatures sensed by said temperature sensing means, signal transforming means connected to one of said temperature sensing means and connected to said comparison device for transforming the control signal produced by the latter to a predetermined degree according to the temperature sensed by the temperature sensing means connected to said signal transforming means, and adjusting means connected to one of said conduit means for adjusting the temperature of the liquid flowing therethrough, said adjusting means being operatively connected to said comparison device for actuation by the transformed signal for maintaining a predetermined difference between the temperatures sensed by said sensing means which difference is modified according to the temperature of the liquid flowing through one of said conduit means and is increased upon a decrease of said last mentioned temperature, and vice versa.

6. An apparatus for controlling the specific gravity of a liquid heated by the admixture of steam, comprising:

supply conduit means for continuously supplying the liquid to be heated, said supply conduit means including a preheater for preheating the liquid, said preheater including heat supply control means for controlling the heat supply to said preheater, heating means receiving preheated liquid from said preheater and including means for admixing steam to the liquid, expansion means receiving heated liquid from said heating means and including means for releasing steam from the liquid and discharge conduit means for discharging the liquid from which steam has been released from said expansion means, temperature sensing means connected to said supply conduit means downstream of said preheater for sensing the temperature of the liquid prior to heating in said heating means, temperature sensing means connected to said discharge conduit means for sensing the temperature of the liquid discharged from said expansion means, a comparison device operatively connected to said temperature sensing means for producing a control signal corresponding to the difference between the temperatures sensed by said temperature sensing means, and signal transforming means connected to one of said temperature sensing means and connected to said comparison device for transforming the control signal produced by the latter to a predetermined degree according to the temperature sensed by the temperature sensing means connected to said signal transforming means, said heat supply control means being operatively connected to said comparison device for actuation by said transformed control signal for maintaining a predetermined difference between the temperatures sensed by said sensing means which difference is modified according to the temperature of the liquid flowing through one of said conduit means and is increased upon a decrease of the preheat temperature of the liquid, and vice versa.

7. An apparatus for controlling the specific gravity of a liquid heated by the admixture of steam, comprising:

supply conduit means for continuously supplying the liquid to be heated, heating means continuously receiving liquid from said supply conduit means and including means for mixing the liquid with steam, expansion means connected to and continuously receiving heated liquid from said heating means and including means for releasing steam from the liquid and discharge conduit means for discharging the liquid from which steam has been released from said expansion means, said expansion means including control means for controlling the expansion pressure, temperature sensing means connected to said supply conduit means for sensing the temperature of the liquid prior to heating in said heating means, temperature sensing means connected to said discharge conduit means for sensing the temperature of the liquid discharged from said expansion means, a comparison device operatively connected to said temperature sensing means for producing a control signal corresponding to the difference between the temperatures sensed by said temperature sensing means, and signal transforming means connected to one of said temperature sensing means and connected to said comparison device for transforming the control signal produced by the latter to a predetermined degree according to the temperature sensed by the temperature sensing means connected to said signal transforming means, said control means for controlling the expansion pressure being operatively connected to said comparison device for actuation by said transformed control signal for maintaining a predetermined difference between the temperatures sensed by said sensing means which difference is modified according to the temperature of the liquid flowing through one of said conduit means and is increased upon a decrease of the preheat temperature of the liquid, and vice versa.

8. An apparatus as defined in claim 7 wherein said expansion means includes:

a low pressure chamber, a container connected to said heating means for receiving heated liquid therefrom, said container having a steam space and a liquid space, a conduit connecting said steam space to said low pressure chamber, said control means for controlling the expansion pressure being in the form of a valve interposed in said last mentioned conduit.

References Cited in the file of this patent

UNITED STATES PATENTS

| 3,010,832 | Dahlstedt | Nov. 28, 1961 |
| 3,041,958 | Abrams et al. | July 3, 1962 |
| 3,101,041 | Hallstrom | Aug. 20, 1963 |

FOREIGN PATENTS

| 802,338 | Great Britain | Oct. 1, 1958 |